US012758812B2

(12) United States Patent
Johnson et al.

(10) Patent No.: US 12,758,812 B2
(45) Date of Patent: Oct. 13, 2026

(54) LOW NOISE NOZZLE ASSEMBLY FOR FIRE SUPPRESSION SYSTEM

(71) Applicant: Kidde-Fenwal, LLC, Ashland, MA (US)

(72) Inventors: Paul M. Johnson, Clinton, MA (US); Sudarshan N. Koushik, West Hartford, CT (US); Duane C. McCormick, Colchester, CT (US); May L. Corn, Manchester, CT (US); Changmin Cao, Pudong (CN); Christopher T. Chipman, Killingly, CT (US)

(73) Assignee: Kidde-Fenwal, LLC, Ashland, MA (US)

( * ) Notice: Subject to any disclaimer, the term of this patent is extended or adjusted under 35 U.S.C. 154(b) by 324 days.

(21) Appl. No.: 17/264,145

(22) PCT Filed: Aug. 1, 2019

(86) PCT No.: PCT/US2019/044765
§ 371 (c)(1),
(2) Date: Jan. 28, 2021

(87) PCT Pub. No.: WO2020/028731
PCT Pub. Date: Feb. 6, 2020

(65) Prior Publication Data

US 2021/0346742 A1 Nov. 11, 2021

Related U.S. Application Data

(60) Provisional application No. 62/713,609, filed on Aug. 2, 2018.

(51) Int. Cl.

| | |
|---|---|
| ***A62C 31/05*** | (2006.01) |
| ***B05B 1/00*** | (2006.01) |
| ***B05B 15/40*** | (2018.01) |

(52) U.S. Cl.
CPC .............. *A62C 31/05* (2013.01); *B05B 1/002* (2018.08); *B05B 15/40* (2018.02)

(58) Field of Classification Search
CPC .......... A62C 31/05; B05B 15/40; B05B 1/002
(Continued)

(56) References Cited

U.S. PATENT DOCUMENTS 3,744,723 A * 7/1973 Davis ........................ B05B 1/14 239/560
4,958,554 A * 9/1990 Spaeth .................... F24F 13/02 169/48

(Continued)

FOREIGN PATENT DOCUMENTS

CN 106861101 A 6/2017
CN 108187270 A 6/2018

(Continued)

OTHER PUBLICATIONS

Google English translation of FR2812206 (Year: 2002).*
International Search Report issued in PCT/US2019/044765, dated Jan. 13, 2020.

*Primary Examiner* — Chee-Chong Lee
(74) *Attorney, Agent, or Firm* — HONIGMAN LLP; Andrew J. Boes; Jonathan P. O'Brien

(57) ABSTRACT

A nozzle assembly for a fire suppression system is disclosed, which includes a body having an inlet end for receiving a flow of fire extinguishing agent from the fire suppression system at an inlet pressure, a nozzle portion extending from the body and having an interior cavity defining a central axis, wherein a plurality of exit orifices are formed in an outer wall of the nozzle portion, in communication with the interior cavity, for vectoring the flow of fire extinguishing agent exiting therefrom and to reduce a noise level of the nozzle assembly, and at least one perforated filter member positioned upstream from the exit orifices in the nozzle
(Continued)

portion, for reducing the inlet pressure of the fire extinguishing agent in furtherance of noise level reduction.

14 Claims, 8 Drawing Sheets

(58) Field of Classification Search
USPC ........................................................... 169/11
See application file for complete search history.

(56) References Cited

U.S. PATENT DOCUMENTS

| | | | | | |
|---|---|---|---|---|---|
| 5,301,756 | A * | 4/1994 | Relyea | A62C 27/00 | |
| | | | | 239/596 | |
| 5,653,391 | A * | 8/1997 | Inamura | B05B 1/14 | |
| | | | | 239/560 | |
| 5,857,623 | A * | 1/1999 | Miller | B05B 3/06 | |
| | | | | 239/560 | |
| 6,318,474 | B1 * | 11/2001 | Sundholm | B05B 1/14 | |
| | | | | 169/37 | |
| 6,375,757 | B2 * | 4/2002 | Gazewood | B08B 9/0433 | |
| | | | | 134/22.12 | |
| 9,308,404 | B2 * | 4/2016 | Popp | A62C 3/00 | |

FOREIGN PATENT DOCUMENTS

| | | | | |
|---|---|---|---|---|
| CN | 207708375 U | | 8/2018 | |
| DE | 102014203043 B3 | | 3/2015 | |
| EP | 151800 A2 | | 8/1985 | |
| EP | 3195905 A1 | | 7/2017 | |
| FR | 2812206 | * | 2/2002 | A62C 31/02 |
| WO | WO1998004322 | * | 2/1998 | A62C 2/08 |
| WO | 2018/123656 A1 | | 7/2018 | |

* cited by examiner

LOW NOISE NOZZLE ASSEMBLY FOR FIRE SUPPRESSION SYSTEM

CROSS REFERENCE TO RELATED APPLICATIONS

This Application a U.S. National Phase Application filed under 35 U.S.C. § 371, based on International PCT Patent Application No. PCT/US2019/044765, filed Aug. 1, 2019, which application claims priority to U.S. Provisional Patent Application No. 62/713,609 filed on Aug. 2, 2018. The entire contents of these applications is incorporated herein by reference.

BACKGROUND OF THE INVENTION

1. Field of the Invention

The subject invention is directed to fire suppression systems, and more particularly, to a low noise nozzle assembly for use with a fire suppression system.

2. Description of Related Art

Data centers are relied upon to store and distribute valuable information across many industries. Industry demands that these data centers remain continuously functional. Downtime can damage the reputation of a data center and result in the loss of customers. Information handled by data centers is primarily stored on magnetic Hard Disk Drives (HDDs). These hardware devices have a known sensitivity to sound, that is, sound pressure can cause vibration-induced damage or disruptions to an HDD.

Unfortunately, inert gas fire suppression systems typically used to protect the server rooms that house this type of equipment in a data center, utilize nozzles that can produce sound levels which may have an adverse effect on this noise sensitive hardware. Some common nozzles generate noise levels in excess of 130 db, which creates an unacceptable risk of lost operation time for a data center.

SUMMARY OF THE DISCLOSURE

The subject invention is directed to a new and useful nozzle assembly for a fire suppression system that does not generate sound levels that are high enough to have an adverse effect on magnetic HDDs. The nozzle assembly includes a body having an inlet end for receiving a flow of fire extinguishing agent from the fire suppression system at an entrance velocity and inlet pressure.

The nozzle assembly further includes a nozzle portion extending from the body and having an interior cavity defining a central axis. A plurality of exit orifices are formed in an outer wall of the nozzle portion, in communication with the interior cavity, for vectoring the flow of fire extinguishing agent exiting therefrom. The nozzle assembly further includes at least one perforated filter member positioned upstream from the exit orifices, for reducing the entrance pressure of the fire extinguishing agent.

Preferably, the inlet end of the body includes a threaded flange configured for operative engagement with a threaded fitting adapted to communicate with the fire suppression system. The threaded fitting preferably includes a metering orifice plate, and the perforated filter member is preferably supported within the interior cavity of the body, sandwiched between an interior abutment surface of the body and a leading edge of the threaded fitting, downstream from the metering orifice.

In an embodiment of the invention, the perforated filter member is formed from a perforated metal plate. It is envisioned that the perforated filter member can include a plurality of perforated filter members positioned within the interior cavity of the nozzle inlet in spaced apart relationship along the central axis thereof. It is also envisioned that each of the plurality of perforated filter members could have a different porosity. In such an embodiment, the filter members could decrease in porosity in a downstream direction or may remain the same along the central axis of the nozzle portion. In another embodiment of the subject invention, the perforated filter member is formed from porous metal foam. Alternatively, the perforated filter member could be formed as a combination of a perforated metal plate and porous metal foam insert, where the porous metal foam insert would be positioned upstream from the perforated filter member.

In an embodiment of the subject invention, the nozzle portion is axially aligned with the body of the nozzle assembly, the nozzle portion has a conical outer wall, and the exit orifices are defined in the conical outer wall of the nozzle portion. In such an embodiment, it is envisioned that the exit orifices defined in the conical outer wall of the nozzle portion could be oriented at an angle that is perpendicular to the central axis of the nozzle portion to control fluid vectoring.

Alternatively, the exit orifices defined in the conical outer wall of the nozzle portion could be oriented at angle that is perpendicular to the local wall angle of the conical outer wall of the nozzle portion. It is also envisioned that the exit orifices in the conical outer wall of the nozzle portion could vary in diameter along the central axis of the nozzle portion, in a downstream direction.

In another embodiment of the subject invention, the nozzle assembly is designed for use in a server room that has height limitations. The nozzle assembly includes a cylindrical body portion having a threaded inlet end for receiving fire extinguishing agent from a fire suppressant system at a particular entrance mass flow and inlet pressure, and a radially enlarged cylindrical nozzle portion that has an outer peripheral wall having a plurality of exit orifices formed therein for vectoring the flow of agent in a 360 degree pattern.

In this embodiment of the nozzle assembly, turning vanes are provided between the inlet end of the body and the outer peripheral wall of the nozzle portion for directing flow. In addition, at least one perforated filter member is positioned within the cylindrical nozzle portion downstream from the turning vanes for reducing the inlet pressure of the fire extinguishing agent.

These and other features of the subject invention will become more readily apparent to those having ordinary skill in the art to which the subject invention appertains from the detailed description of the embodiments of the invention taken in conjunction with the following brief description of the drawings.

BRIEF DESCRIPTION OF THE DRAWINGS

So that those skilled in the art will readily understand how to make and use the low velocity acoustic reduction nozzle of the subject invention without undue experimentation, embodiments thereof will be described in detail herein below with reference to the figures wherein.

DETAILED DESCRIPTION OF THE INVENTION

Figure 1:
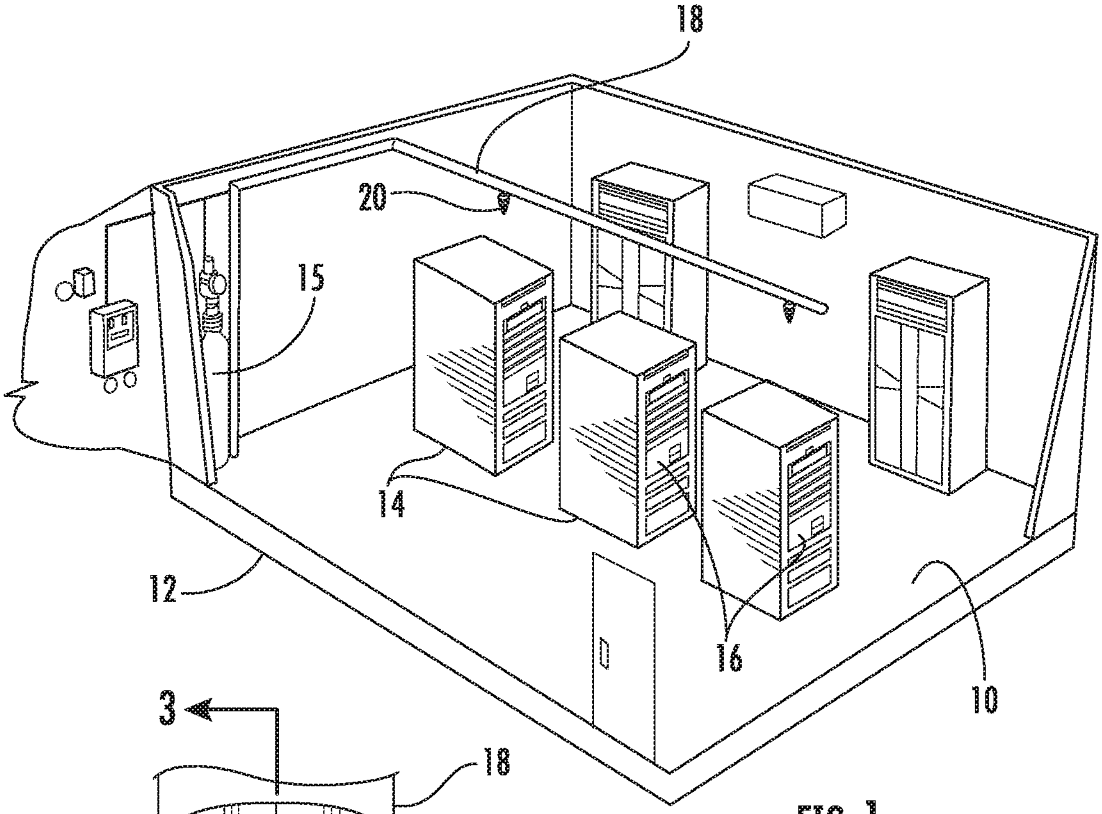
FIG. 1 is a perspective view of a server room in a data center that is protected by a fire suppression system including a low-velocity nozzle configured in accordance with an embodiment of the subject invention.

A nozzle for a fire suppression system that produces lower noise levels would protect data centers without risk of lost operation time. Referring now to the drawings wherein like reference numerals identify similar structural elements and features of the subject invention, there is illustrated in FIG. 1 a server room 10 located in a data center 12, which houses racks 14 containing hard disk drives 16, and a fire suppression system 18 for protecting the server room 10 in the event of the detection of a hazardous condition such as smoke, excessive heat or fire. The fire suppression system 18 includes a storage tank 15 containing an inert gas fire suppressant, such as argon. The fire suppression system 18 further includes one or more low-velocity acoustic noise reduction nozzle assemblies constructed in accordance with an embodiment of the invention and designated generally by reference numeral 20 for discharging the fire suppressant contained in storage tank 15 into the server room 10 in the event of the detection of a hazardous condition.

Figure 2:
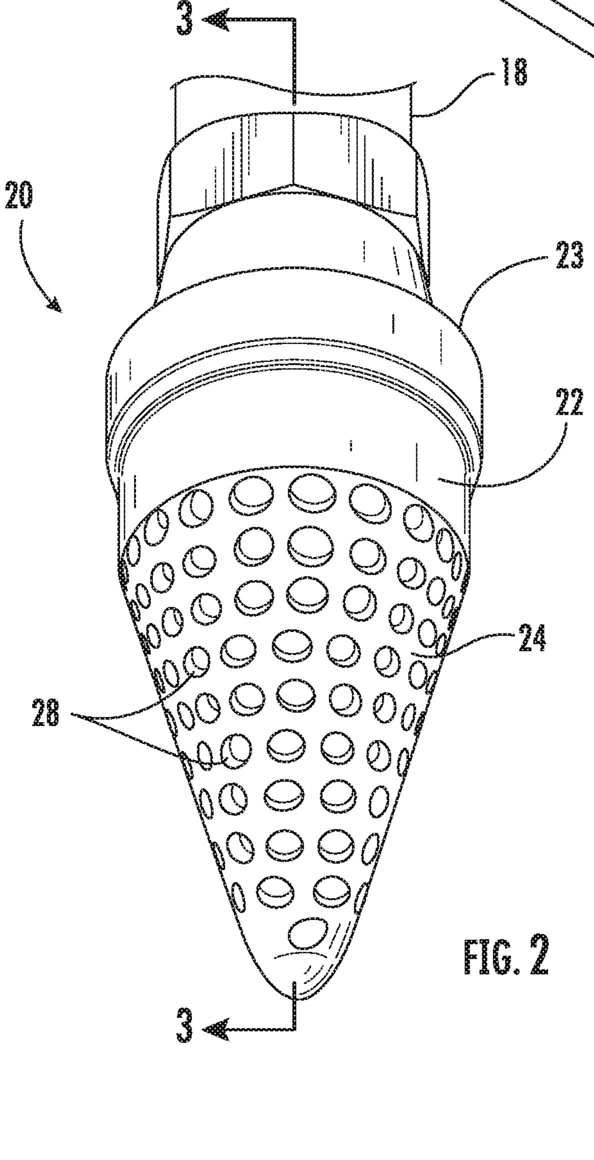
FIG. 2 is a perspective view of a preferred embodiment of the low-velocity nozzle of the invention.

FIG. 2 illustrates a perspective view of a preferred low-velocity nozzle. The nozzle assembly 20 of the subject invention includes a body 22 having an inlet end 23 for receiving a flow of fire extinguishing agent from the fire suppression system 18 at a particular entrance mass flow of about between 0.1 and 0.5 kg/s (e.g., 0.3 kg/s) and inlet pressure of about between 60 to 70 psig (e.g., 66 psig). The body 22 of nozzle assembly 20 further includes an axially extending nozzle portion 24. A plurality of exit orifices 28 are formed through the nozzle portion 24 for efficiently vectoring the flow of fire extinguishing agent exiting therefrom as described below.

Figure 3:
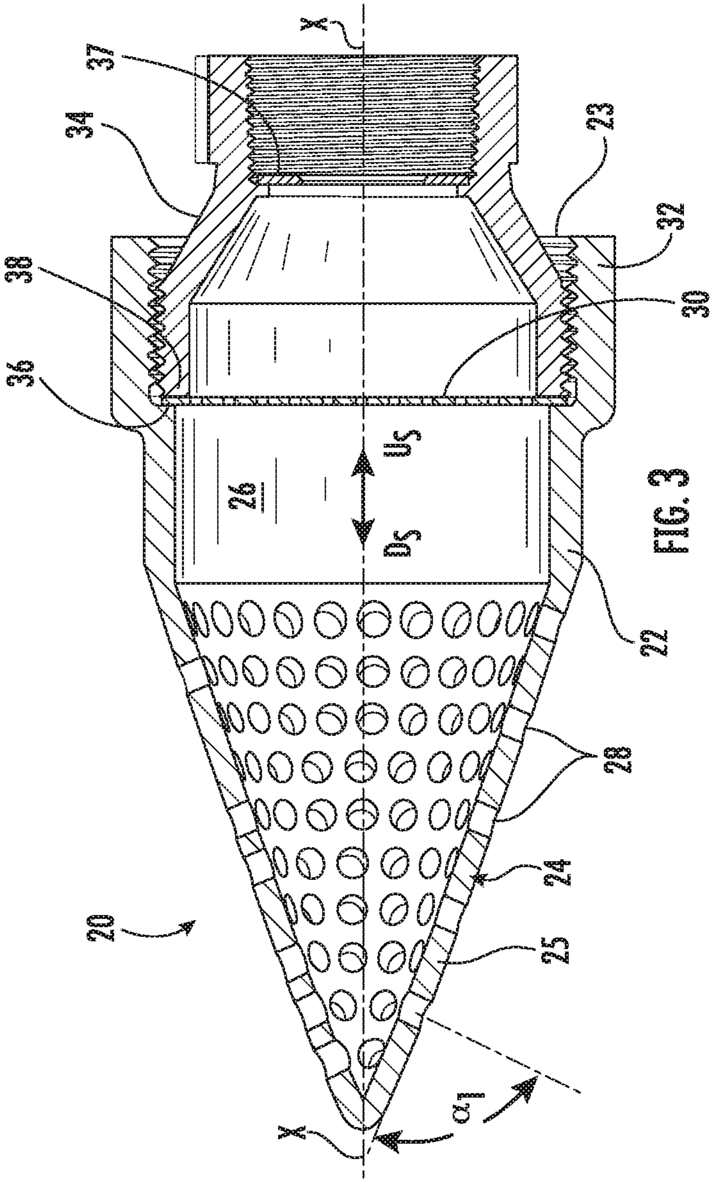
FIG. 3 is a cross-sectional view of the nozzle of the preferred embodiment taken along line 3-3 of FIG. 2.

FIG. 3 illustrates a cross-sectional view of the nozzle taken along line 3-3 of FIG. 2. The axially extending nozzle portion 24 of nozzle assembly 20 has a conical outer wall 25 and an interior cavity 26 that defines a central longitudinal axis extending along line X-X in upstream direction $U_s$ and downstream direction $D_s$. A plurality of exit orifices 28 are formed in the conical outer wall 25 of nozzle portion 24 for efficiently vectoring the flow of fire extinguishing agent exiting therefrom and to effectively reduce the acoustic noise level of the nozzle assembly 20. Moreover, the exit orifices 28 formed in the conical outer wall 25 of nozzle portion 24 help to reduce the overall acoustic signature of the nozzle assembly 20.

A perforated filter member 30 is positioned within the interior cavity 26 of the nozzle portion 24, upstream from the exit orifices 28 formed in the conical outer wall 25, for reducing the entrance velocity of the fire extinguishing agent, in furtherance of acoustic noise level reduction. Moreover, the perforated filter member 30 described in further detail below functions to lower the pressure of the incoming flow before entering the nozzle portion 24, dropping the inlet pressure by about 60 psig to a preferred exit pressure of about 2 psig to avoid supersonic jet flow through the nozzle assembly 20.

As a result of the perforated filter member 30 advantageously lowering the velocity and pressure of the incoming flow of fire suppressant, in combination with the exit orifices 28 lowering the acoustic signature of the nozzle assembly 20, the nozzle assembly has a resulting noise level of less than 110 db. Those skilled in the art will readily appreciate that achieving such a noise level will not cause damage or disruption to the HDDs 16 that are located within the server room of a data center 12 in the event of a fire.

Figure 7:
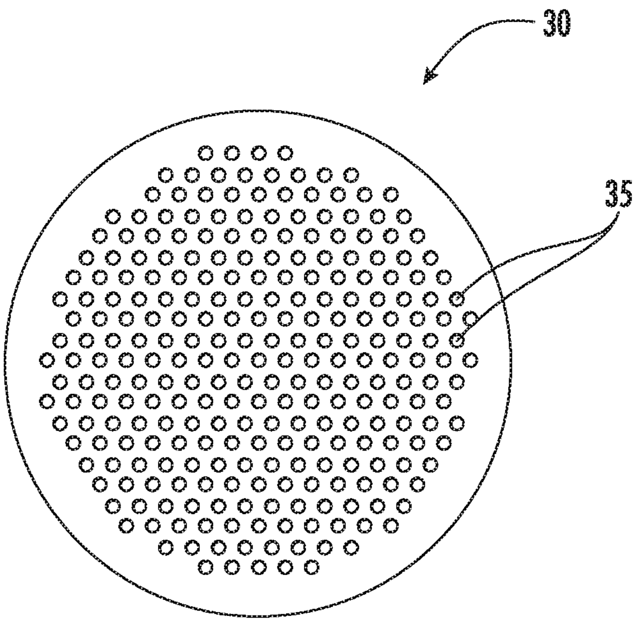
FIG. 7 is a front plan view of a perforated filter member in the form of a perforated metal plate having a multiplicity of perforations.

The perforated filter member 30 is in the form of a perforated metal plate, which is best seen in FIG. 7. The perforated metal plate of filter member 30 is preferably made from aluminum or a similar light-weight metal having a thickness of about $1/16^{th}$ of an inch. Preferably, about 20% to 40% of the surface area of the perforated filter member 30 is defined by open space. For example, the perforated filter member 30 may be defined by about 23% open space formed by a multiplicity of apertures 35.

With continuing reference to FIG. 3, the inlet end 23 of the body 22 of nozzle assembly 20 includes a threaded flange 32, which is configured for operative engagement with a threaded fitting 34. The threaded fitting 34 has a conventional NPT format that is adapted to communicate with the fire suppression system 18 and it includes a metering orifice plate 37. The filter member 30 is supported or otherwise firmly retained within the interior cavity 26 of the body 22 of nozzle assembly 20, sandwiched between an interior abutment surface 36 of the body 22 and a leading edge 38 of the threaded fitting 34.

In the embodiment of FIG. 3, the exit orifices 28 defined in the conical outer wall 25 of the nozzle portion 24 are oriented at an angle $\alpha_1$ that is perpendicular to the local wall angle of the conical outer wall 25 of nozzle portion 24 to control fluid vectoring. Alternatively, as shown in FIG. 4, the exit orifices 28 defined in the conical outer wall 25 of the nozzle portion 24 can be oriented at an angle $\alpha_2$ that is perpendicular to the central axis X-X of the nozzle portion 24 so as to control fluid vectoring in a different manner.

Figure 4:
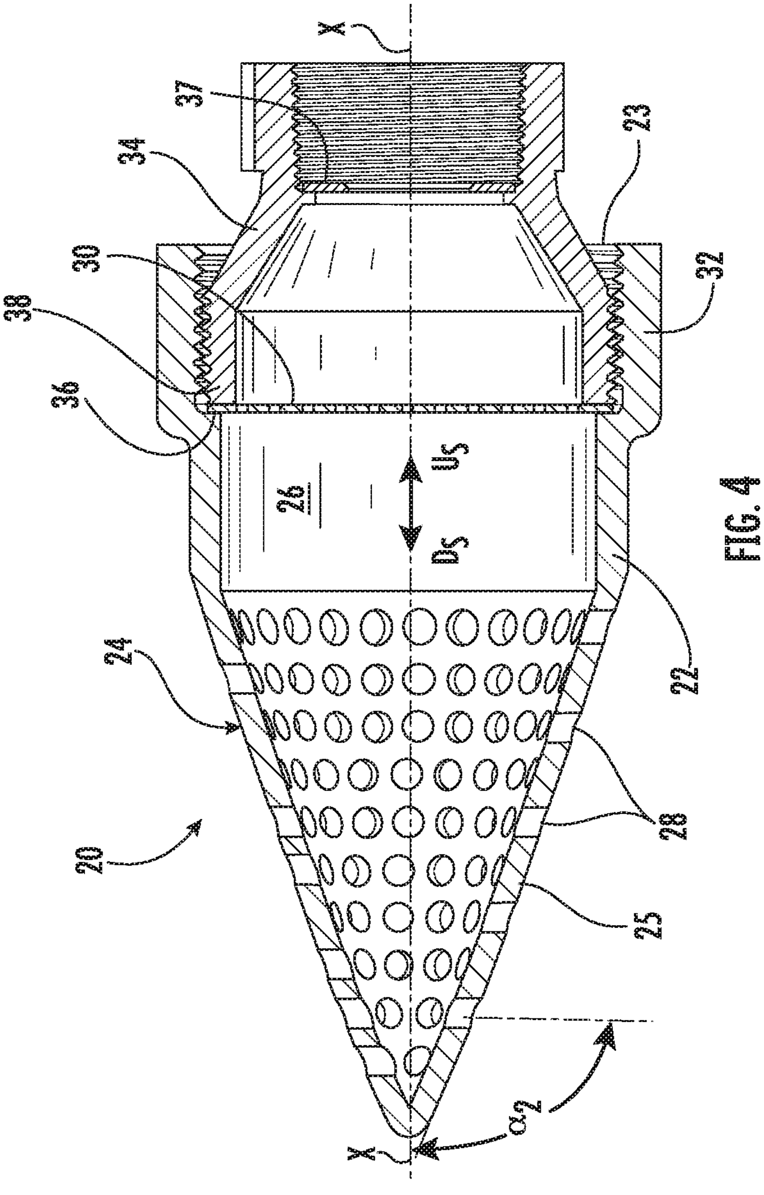
FIG. 4 is a cross-sectional view of the nozzle of an alternative embodiment of the invention.

Alternatively, the exit orifices 28 can be oriented at other angles ranging from the orientation shown in FIG. 3 to the orientation shown in FIG. 4, so as to control fluid vectoring in another preferred manner, which would depend upon the configuration of the area to be protected by the nozzle assembly 20. It is also envisioned that the exit orifices 28 in the conical outer wall 25 of the nozzle portion 24 could vary in diameter and/or in number along the central axis X-X of the nozzle portion 24. For example, the upstream exit orifices 28 can have a diameter "D" while the downstream exit orifices 28 can have a smaller diameter "d" as illustrated in FIG. 5

Those skilled in the art will readily appreciate that the frequency of the noise generated by the nozzle assembly 20 will increase as the exit orifices 28 decrease in size. Accordingly, the diameter of the exit orifices 28 should be sized so as to minimize the overall acoustic signature of the nozzle assembly 20, while maintaining a preferred coverage volume of about 100 $m^3$.

Furthermore, the nozzle portion 24 is preferably dimensioned and configured so that the cross-sectional area thereof at any point along the central axis X-X is equal to the total open area of the exit orifices 28 formed in the conical outer wall 25 of the nozzle portion 24 downstream from that point. Consequently, the static pressure within the interior cavity 26 of the nozzle portion 24 will be maintained at a level that will ensure that fire extinguishing agent is uniformly fed to all of the exit orifices 28 for the entire duration of the discharge, which could range from 60 seconds to 120 seconds.

Figure 5:
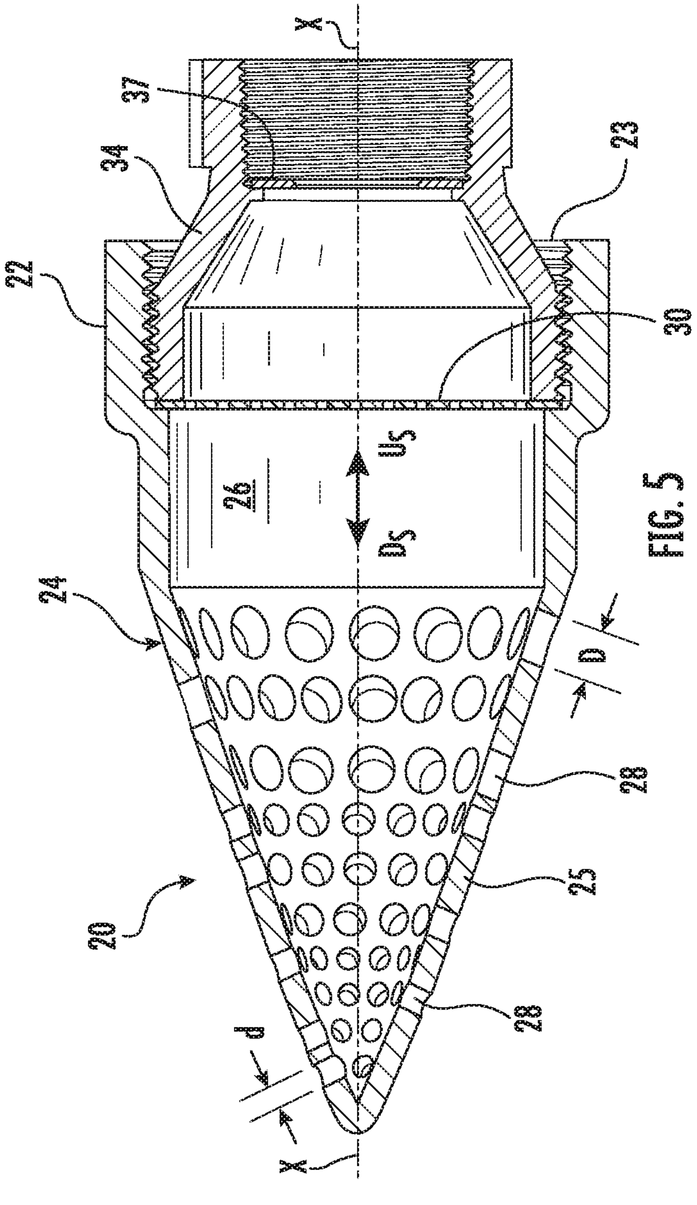
FIG. 5 is a cross-sectional view of the nozzle of another alternative embodiment of the invention.
Figure 6:
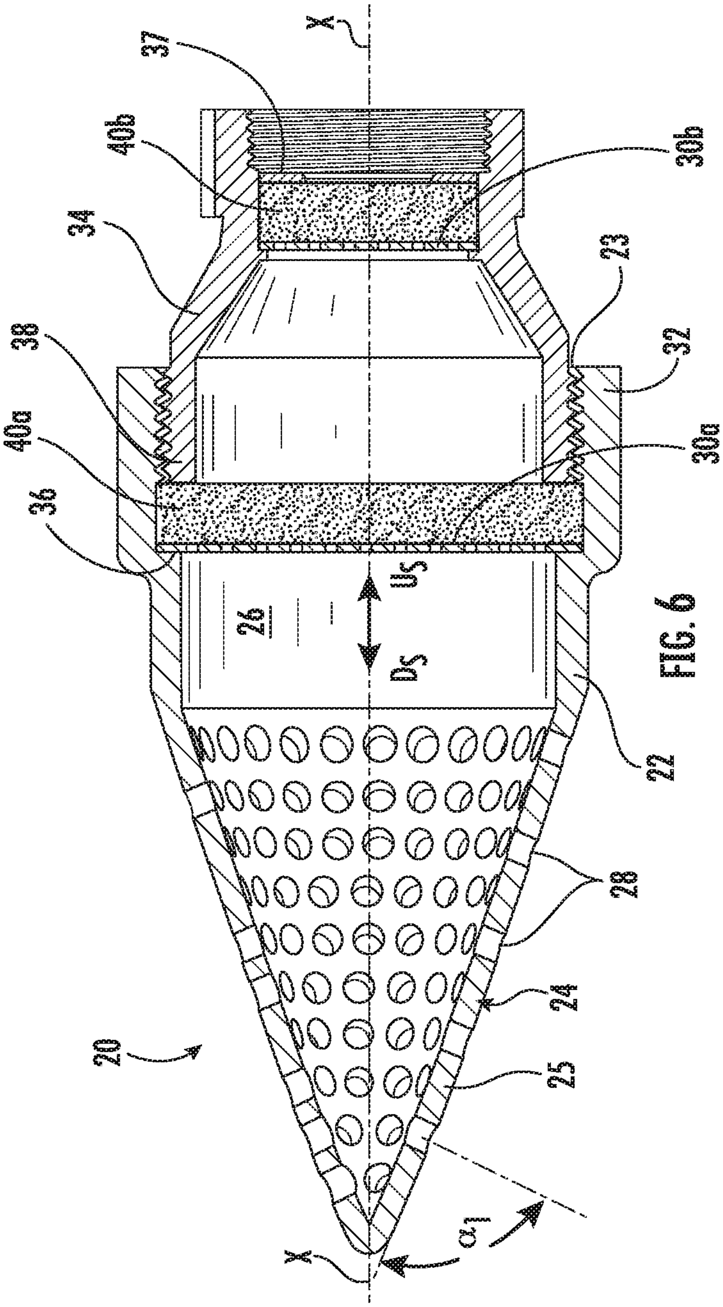
FIG. 6 is a cross-sectional view of the nozzle of another alternative embodiment of the invention.

While the nozzle assembly 20 is illustrated in FIGS. 3-5 is shown with only one perforated filter member 30 positioned within the interior cavity 26 of nozzle portion 24, it is envisioned that the nozzle assembly 20 could include a two or more perforated filter members in spaced apart relationship along the central axis X-X thereof. For example, as best seen in FIG. 6, the nozzle assembly 20 could have two of spaced apart filter members, including a downstream perforated filter member 30*a* positioned within the interior cavity 26 and an upstream perforated filter member 30*b* positioned within the threaded fitting 34.

Furthermore, a porous metal foam insert could be associated with an upstream side of each of the perforated filter members 30*a* and 30*b* to further reduce the inlet pressure of the fire suppressant. More particularly, a porous metal foam insert 40*a* would be associated with an upstream side of perforated filter member 30*a* and a porous metal foam insert 40*b* would be associated with an upstream side of perforated filter member 30*b*. When it is present in the nozzle assembly 20, the porous metal foam inserts are about 0.5 inches in thickness. When used alone or in combination with one another, these porous components function to reduce the pressure while evenly distributing the flow throughout the cross-sectional area, and reducing the noise associated with flow turbulence. When the porous components/perforated metal foam are used just downstream of a metering orifice (see element 37 in FIG. 3), they may function to effectively reduce the noise associated with supersonic flow by dissipating the shock formed downstream of the metering orifice.

While the perforated filter members 30*a* and 30*b* preferably have the same porosity, it is envisioned that each of a plurality of perforated filter members could have a different porosity. For example, in such an embodiment, the perforated filter members 30*a* and 30*b* would decrease in porosity in a downstream direction $D_s$ along the axis X-X of the interior cavity 26. Thus, the upstream filter member 30*a* could be a perforated metal plate having a porosity of about 40% and the downstream filter member 30*b* could be a perforated metal plate having a porosity of about 30%, so as to gradually or otherwise progressively reduce the flow velocity of the fire suppression agent in a stepwise or multi-staged manner. It is also envisioned that the porosity of the upstream filter member 30*a* and the downstream filter member 30*b* could be the same.

Figure 8:
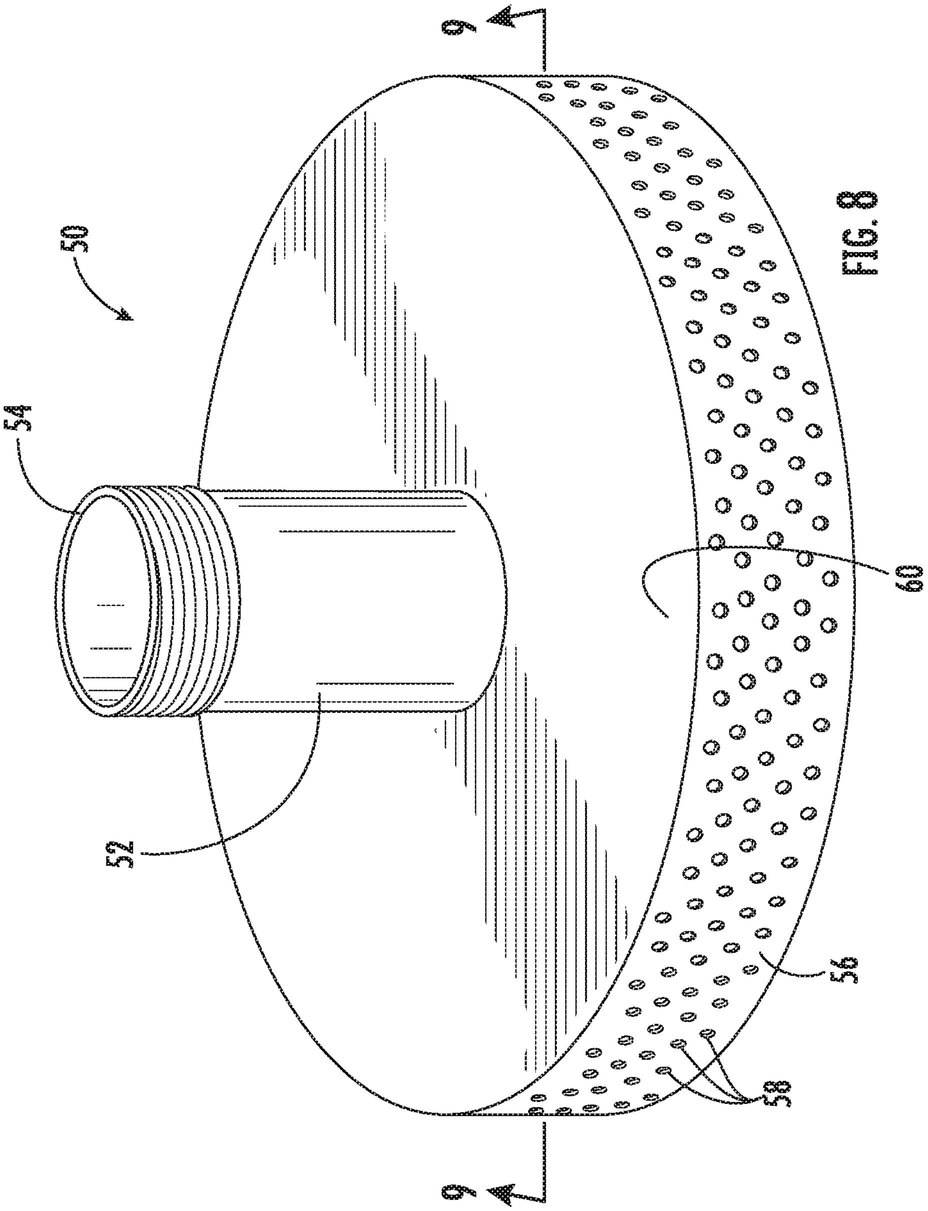
FIG. 8 is a perspective view of another embodiment of the low noise nozzle of the subject invention.
Figure 9:
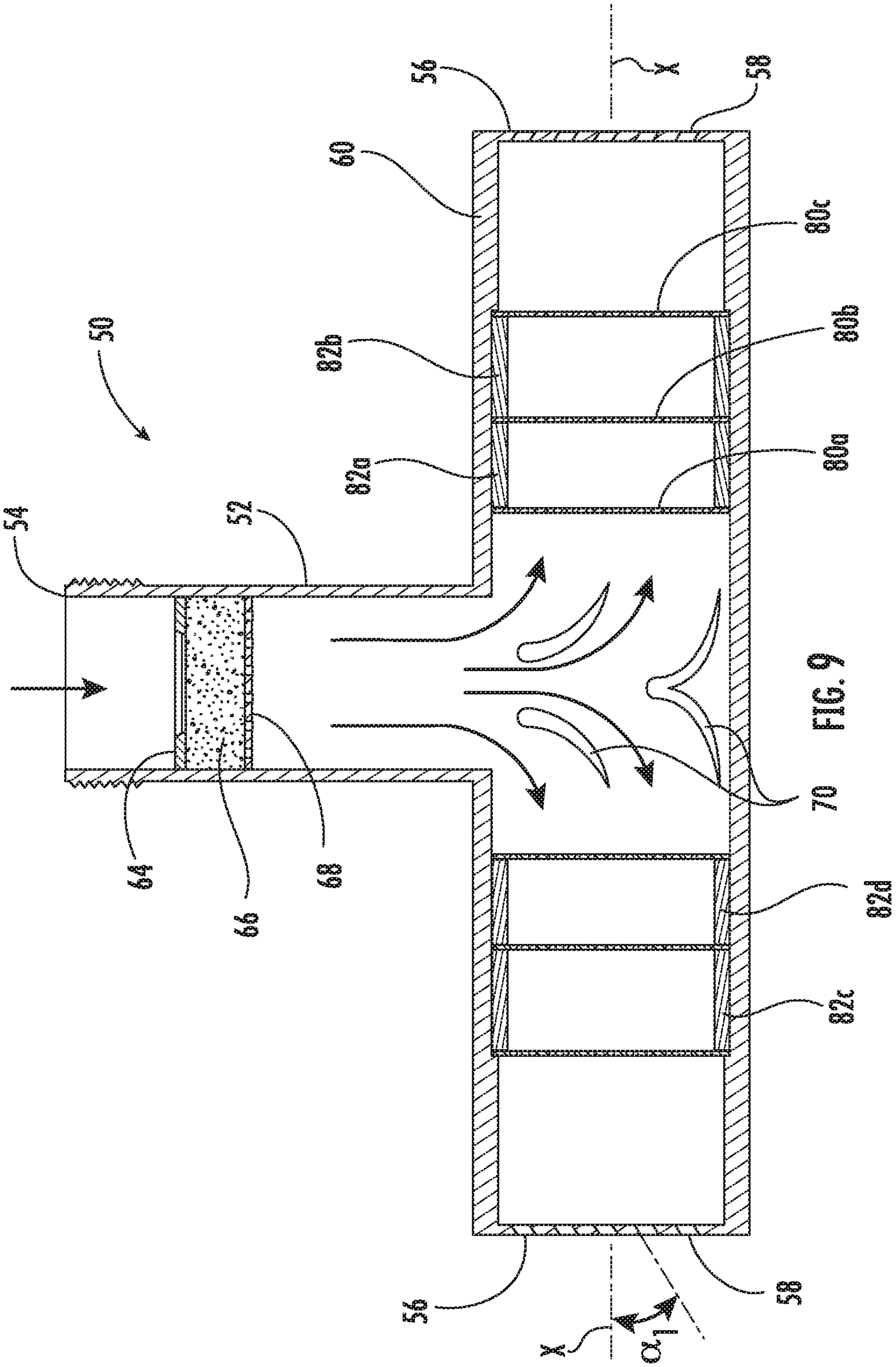
FIG. 9 is a cross-sectional view taken alone line 9-9 of FIG. 8, showing the interior of the nozzle of FIG. 8.

Referring now to FIGS. 8 and 9, there is illustrated another embodiment of the low velocity noise reduction nozzle of the subject invention that is designated generally by reference numeral 50. Nozzle assembly 50 is designed for use in a server room 12 of a data center 10 where there are height limitation issues, and it is configured to efficiently vector a flow of fire extinguishing agent in a 360 degree cylindrical pattern.

With continuing reference to FIG. 8, nozzle assembly 50 includes a cylindrical body portion 52 having a threaded inlet end 54 for receiving fire suppressant agent from a fire suppressant system at a particular entrance mass flow and inlet pressure. Nozzle assembly 50 further includes a cylindrical nozzle portion 60 that has an outer peripheral wall 56 having a plurality of exit orifices 58 formed therein, which are oriented at a preferred angle $\alpha_1$ relative to an axial plane X-X of nozzle portion 60 for fluid vectoring, as shown in FIG. 9. It is envisioned that the exit orifices 58 in the outer wall 56 could all be oriented at the same angle or at they could be oriented at different angles relative to the axial plane X-X of the nozzle portion 60.

The inlet end 54 of the body portion 52 of nozzle assembly 50 includes a metering orifice 64, a porous metal foam insert 66 downstream from the metering orifice 64, and a perforated filter member 68 of the type shown in FIG. 7, downstream from the porous metal foam insert 64. In combination, these components function to initially reduce the entrance pressure of the fire extinguishing agent.

Referring to FIG. 9, turning vanes 70 are provided within the nozzle portion 60 of nozzle assembly 50 between the inlet end 54 of the body portion 52 and the exit orifices 58 in outer wall 56 to direct the flow of fire suppressant and reduce internal noise caused by turbulence. One or more coaxially arranged perforated filter members are also positioned within the cylindrical nozzle portion 60, downstream from the central turning vanes 70 and upstream from the outer peripheral wall 56 for reducing the entrance pressure of the fire extinguishing agent, in furtherance of noise level reduction. More particularly, as shown in FIG. 9, three coaxially arranged perforated filter members 80*a*-80*c* are positioned within nozzle portion 60, separated by a plurality of annular upper and lower spacer rings 82*a*-82*d*.

While the subject disclosure has been shown and described with reference to various embodiments, those skilled in the art will readily appreciate that changes and/or modifications may be made thereto without departing from the scope of the subject disclosure.

What is claimed is:

1. A nozzle assembly for a fire suppression system discharging a fire extinguishing agent being of a gas form, the nozzle assembly configured to threadedly engage a fitting, the nozzle assembly comprising:

a) a body having an inlet end having an interior surface having a first diameter configured to receive the fitting, the inlet configured to receive a flow of the fire extinguishing agent from the fire suppression system at an inlet pressure, the inlet end having a flange portion extending radially from a distal end of the body so as to define an abutment surface extending radially and inwardly from the interior surface;

b) a nozzle portion extending from the body, converging to a nozzle tip and having an interior cavity defining a cylindrical nozzle portion and a conical nozzle portion, wherein the inlet end of the body portion is axially aligned with the nozzle portion along a central axis thereof, the cylindrical nozzle portion being a continuous and uninterrupted wall having a second diameter that is smaller than the first diameter of the inlet, and the conical nozzle portion consisting of a plurality of exit orifices formed in an outer wall of the conical nozzle portion, the plurality of exit orifices are in communication with the cylindrical nozzle portion, for vectoring the flow of fire extinguishing agent exiting therefrom and to reduce a noise level of the nozzle assembly, wherein a axial length along the of the conical nozzle portion is at least double length of the cylindrical nozzle portion; and c) at least one perforated filter member positioned upstream from the plurality of exit orifices formed in the nozzle portion and seated on the abutment surface and pressed between the fitting and the abutment surface, wherein the at least one perforated filter member has between 20% to 40% open area as defined by a multiplicity of perforations so as to reduce the inlet pressure of the fire extinguishing agent in furtherance of noise level reduction.

2. The nozzle assembly as recited in claim 1, wherein the at least one perforated filter member is formed from a perforated metal plate.

3. The nozzle assembly as recited in claim 1, wherein the at least one perforated filter member is formed from an aluminum plate that has 23% open area as defined by a multiplicity of perforations.

4. The nozzle assembly as recited in claim 1, wherein the at least one perforated filter member includes a plurality of perforated filter members positioned within the interior cavity of the nozzle portion in spaced apart relationship along a central axis thereof.

5. The nozzle assembly as recited in claim 4, wherein each of the plurality of perforated filter members has the same porosity.

6. The nozzle assembly as recited in claim 4, wherein each of the plurality of perforated filter members has a different porosity.

7. The nozzle assembly as recited in claim 6, wherein the plurality of perforated filter members decrease in porosity in a downstream direction along the central axis of the nozzle portion.

8. The nozzle assembly as recited in claim 1, wherein a porous metal foam insert is positioned downstream from the at least one perforated filter member.

9. The nozzle assembly as recited in claim 1, wherein the inlet end of the body portion includes a metering orifice.

10. The nozzle assembly as recited in claim 1, wherein the inlet end of the body portion is axially aligned with the nozzle portion along a central axis thereof.

11. The nozzle assembly as recited in claim 1, wherein the exit orifices formed in the conical outer wall of the conical nozzle portion are oriented at an angle that is perpendicular to the central axis of the nozzle portion.

12. The nozzle assembly as recited in claim 1, wherein the plurality of exit orifices formed in the conical outer wall of the conical nozzle portion are oriented at an angle that is perpendicular to a local wall angle of the nozzle portion.

13. The nozzle assembly as recited in claim 1, wherein the exit orifices formed in the conical outer wall of the nozzle portion vary in diameter along the central axis of the nozzle portion in a downstream direction.

14. The nozzle assembly as set forth in claim 1, wherein the interior surface of the inlet end is threaded and the at least one perforated filter member is disposed between the abutment surface and the thread.

* * * * *